United States Patent Office 3,334,296

Patented Aug. 1, 1967

3,334,296

RESISTANCE COMPARISON MEANS HAVING A MODULATED SOURCE AND A DETECTOR SENSITIVE TO THE MODULATING SIGNAL

Barry Rogal and James Stewart Johnston, Bognor Regis, England, assignors to Rosemount Engineering Company, Limited, a British company Filed Sept. 18, 1964, Ser. No. 397,426
Claims priority, application Great Britain, Sept. 1, 1964, 35,740/64
6 Claims. (Cl. 324—62)

This invention relates to resistance comparators.

According to this invention, there is provided means for comparing two resistances comprising two current transformers whose primary windings are fed from the same A.C. source, two rectifying circuits and a detector, wherein the outputs from the secondary windings of the transformers are applied through respective rectifying circuits to respective resistances and wherein the detector compares the potentials across the resistances. With this arrangement, the potentials across the resistances are unidirectional and the detector may be a simple D.C. detector. Preferably the outputs from the secondary windings are connected through capacitative circuits to the rectifying circuits. With this preferred arrangement, no rectified current from the rectifying circuits can pass to the transformers to polarise the transformer cores.

The detector is preferably a null detector and either one of the resistances may be variable to obtain the null condition or the transformation ratio of a transformer may be variable. A winding of the transformer may be connected along its length to a number of tapping points for this purpose.

The transformation ratio may be arranged to vary in a non-linear manner with the position of the tapping point connected for use. For example, the transformation ratio may have a constant component, a component varying linearly with the tapping position and a component varying quadratically with the tapping position. The output from the detector may be connected to servo means for actuating said variation.

Preferably modulating means may be provided to modulate the alternating supply to the primary windings of the transformers at a frequency of a lower order than the frequency of the alternating supply. In this case, the detector may be a phase sensitive detector supplied with a reference signal from the modulating means. In this case, the detector is made responsive to the modulating frequency. When the alternating supply is modulated, the potentials across the resistances are also modulated and the effect of stray electromotive forces, such as those due to thermal effects, can be cancelled out. The detector responds to the low modulation frequency, at which the reactive components of the cable and load impedances can be neglected, and yet the transformers carry the higher frequency alternating supply, at which frequency transformers are relatively simple. When the detector is phase sensitive, the direction of unbalance as well as the magnitude can be sensed.

Preferably the modulation frequency is an integral quotient of the mains frequency (that is, of 50 or 60 c./s.).

The transformers may have toroidal cores of coiled strip material of high permeability. One or both transformers may have an additional secondary winding connected across an impedance, or one or both transformers may have two additional secondary windings connected to a high gain amplifier, one winding in the input circuit of the amplifier and one in its output circuit.

Examples of the invention will now be described with reference to the accompanying drawings, in which.

Figure 1:
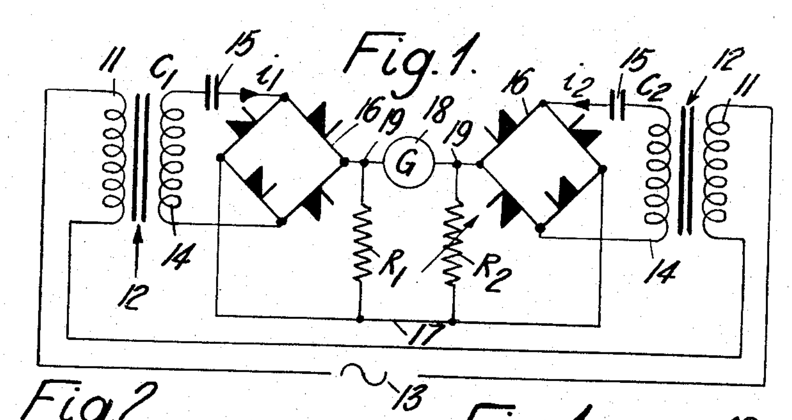
FIGURE 1 is a circuit diagram of one example of the invention.

In these examples of resistance comparators, the primary windings 11 of two isolated transformers 12 are connected in series and are fed with an alternating signal from a one kilocycle source 13. The secondary windings 14 of the transformers 12 are connected through blocking condensers 15 to respective full wave rectifying bridges 16. The rectified signals from the bridges 16 are connected across respective resistances, $R_1$, $R_2$ and the resistances are connected together at one end 17. The resultant potentials across the resistances are compared by a detector 18. The transformers 12 are current transformers, in which the current in the secondary winding 14 is proportional to the current in primary winding 11 and is not substantially affected by the load in the secondary circuit. The current in the secondary circuit is independent of the variation of resistance in the leads to the resistance under comparison. The detector compares the potentials across the resistances only, so that the lead resistance have no effect on the comparison.

In the comparator of FIGURE 1, a galvanometer 18 is connected across the free ends 19 of the resistances $R_1$, $R_2$. When the galvanometer 18 registers zero current, the potentials across the resistances are the same. The rectified current in each resistance is a known fraction of the amplitude of the alternating current in the secondary winding, and that ratio of the current in the secondary winding to that in the primary winding is the transformation ratio K of the transformer.

The current in the secondary winding of one transformer is $K_1i$, and that in the secondary winding of the other transformer is $K_2i$, since both primary windings 11 carry the same current $i$. Assuming the rectifying bridges 16 have the same characteristics, the currents in the resistances $R_1$, $R_2$ will be in the same proportion $\alpha$ to the currents in the secondary windings 14. The potential across resistance $R_1$ is $\alpha K_1R_1i$ and that across resistance $R_2$ is $\alpha K_2R_2i$. When one transformation ratio $K_1$ or $K_2$ or resistance $R_2$ is varied so that the galvanometer registers zero current, $$R_1=\frac{K_2}{K_1}R_2 \quad (1)$$

Figure 2:
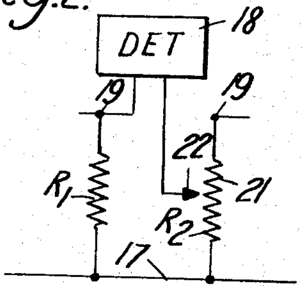
FIGURE 2 is a circuit diagram of a modified detector circuit of the example of FIGURE 1.

The comparator may be modified as shown in FIGURE 2, one resistance 21 being a potentiometer and the galvanometer 18 being connected to the slider 22 of the potentiometer and not to its free end 19. The galvanometer 18 then compares the potential across the unknown resistance $R_1$ with the fractional resistance $R_2$ of the potential across the known resistance 21 between the slider 22 and the ends 17 of the resistances connected together. The potentiometer 21 can be calibrated to read off the value of $R_2$ or to read off the value of $R_1$ given by Equation 1 above when the galvanometer 18 has no current flowing through it. The output of the galvanometer may be connected to a servo motor (not shown) for driving the slider 22 to balance the potentials across $R_1$, $R_2$.

Figure 3:
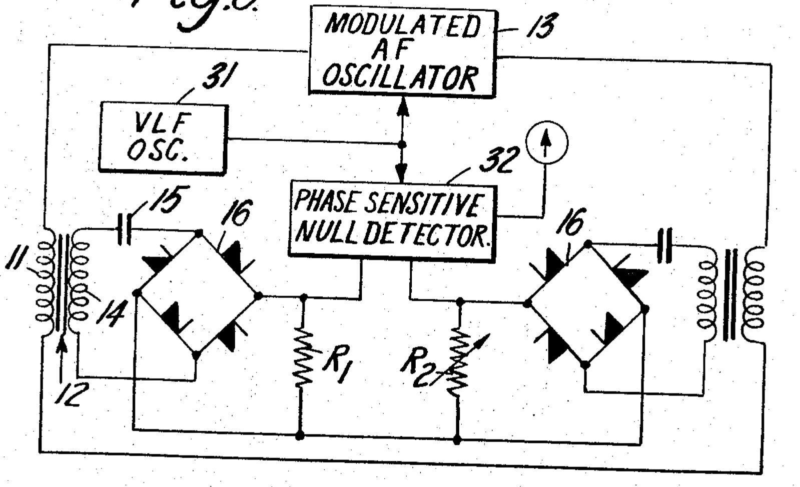
FIGURE 3 is a circuit diagram of a second example of the invention.

In the comparator of FIGURE 3, the signal from a 5 c./s. oscillator 31 is used to modulate the 1 kc./s. source 13 and is also connected to a phase sensitive null detector 32 to provide a reference signal. The detector is sensitive to signals at 5 c./s. but not to signals of 1 kc./s. and higher frequencies. The transformation ratios $K_1$, $K_2$ or the known resistance $R_2$ may be varied until the phase sensitive detector 32 registers zero current, when the unknown resistance $R_1$ may be determined from Equation 1.

This arrangement combines the advantages of alternating and direct current operation. The transformers carrying the modulated 1 kc./s. signal are much smaller than transformers would be carrying 5 c./s. signals. The reactive parts of the cable and load impedances are negligible at 5 c./s. at which the measurement is made compared with the impedances at 1 kc./s. and the detector need only be a simple one. Stray voltages, such as those due to thermal effects, can be cancelled out in alternate half cycles of the 5 c./s. signals in the detector. The phase sensitive detector enables the direction of unbalance to be indicated.

Spurious signals at the frequency of the supply mains are commonly induced into measuring circuits of this type and may interfere with their operation. To minimise this effect, the 5 c./s. oscillator is controlled by division of the mains frequency by an integral factor in a digital counting circuit. This ensures that each sampling operation of the phase sensitive demodulator includes a fixed whole number of cycles of the mains frequency "pick-up." The 5 c./s. oscillator is conveniently a square-wave oscillator.

The cores of the transformers are formed from a thin strip of high permeability ferro-magnetic material coiled into a toroid (not shown). With such cores the transformation ratio between the currents in the primary and secondary windings may be kept constant. If the effective shunting resistance across the secondary winding (due to magnetising inductance, parallel effective loss resistance and winding capacitance reactance) drops and becomes comparable with the load and secondary winding impedances, the transformation ratio does not remain constant. The resistance of a resistance thermometer is a few hundred ohms only, so that the shunting resistance need not be maintained at very high values to maintain the constancy of the transformation ratio in such an application.

Figure 4:
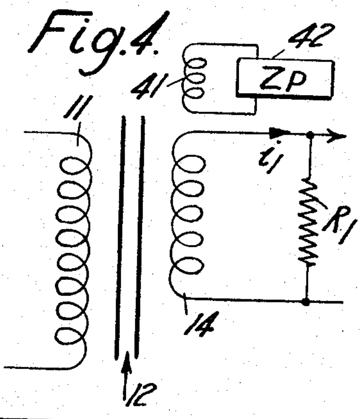
FIGURE 4 is a circuit diagram of a modification which can be applied to either example of the invention.

When strict constancy of the ratio of the two transformation ratios is required, an additional secondary winding 41 may be added to one transformer, as shown in FIGURE 4. The additional winding 41 is connected across an additional load 42 to bring the total effective shunt load across the main secondary winding 14 to a desired value.

Figures 5, 6, 7:
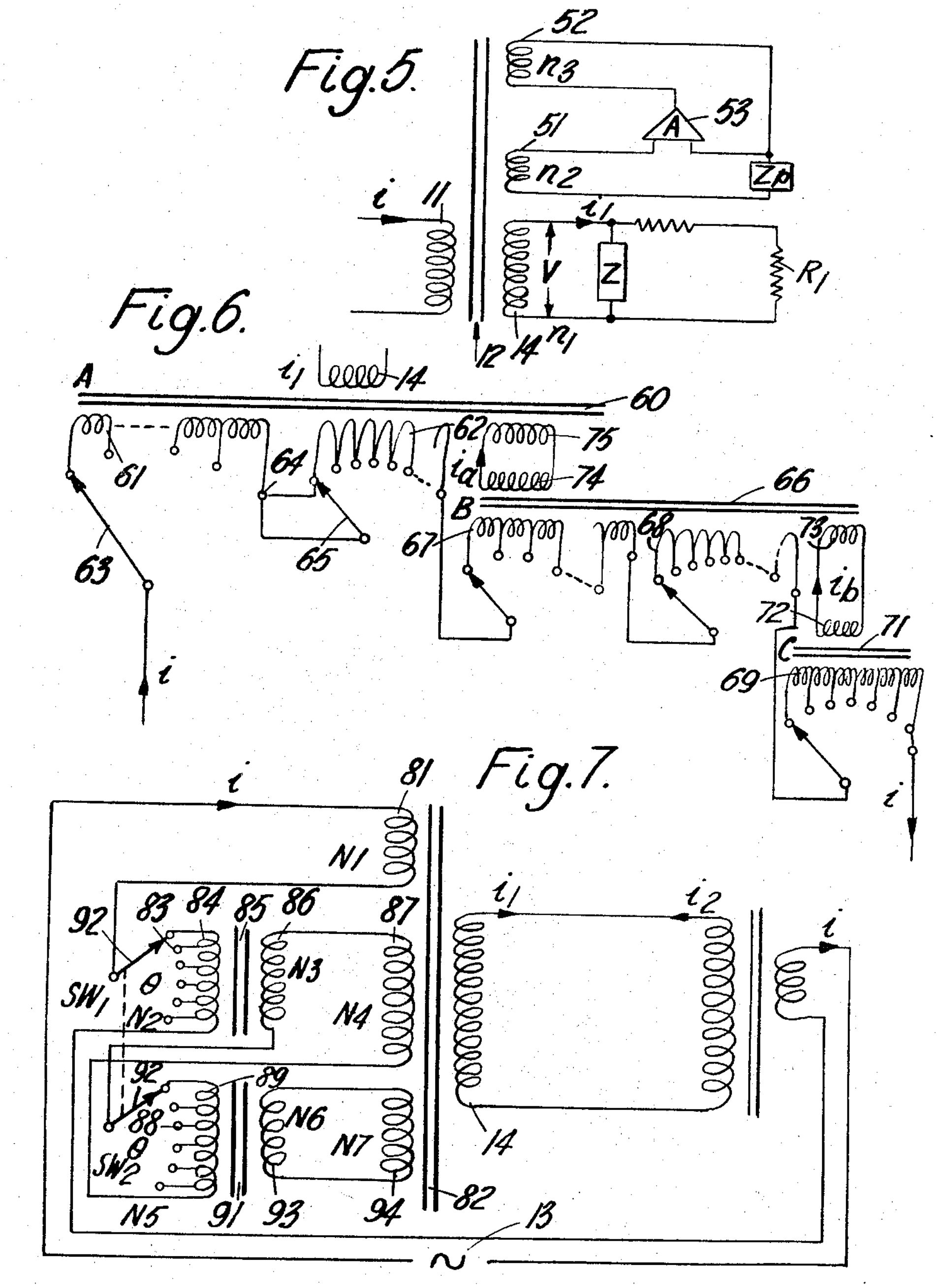
FIGURE 5 is a circuit diagram of a further such modification.
FIGURE 6 is a circuit diagram of a transformer with a variable transformation ratio.
FIGURE 7 is a circuit diagram of another transformer with a variable transformation ratio.

FIGURE 5 shows a circuit for cancelling the effect of the shunt impedance Z of a transformer 12. The transformer has an additional secondary winding 51 connected in series with a load $Zp$ across the input of a high gain amplifier 53 and an input winding 52 connected across the output of the amplifier.

When a voltage V appears across the main secondary winding 14 of the transformer, a current V/Z is lost in the shunt impedance. When the voltage V appears across the main winding 14 with $N_1$ turns a voltage $N_2V/N_1$ appears across the first additional winding 51 with $N_2$ turns and, since the amplifier 53 is of very high gain, the voltage across the input is negligible and a substantially equal voltage appears across the load $Zp$, causing a current $N_2V/N_1Zp$ to flow in the second additional winding 52. This second additional winding 52 is connected so that an additional flux is induced in the core of the transformer 12 and produces an additional current in the main winding 14 equal to that lost in the shunt impedance Z when $$\frac{V}{Z}=\frac{N_2V}{N_1Z_p}\cdot\frac{N_3}{N_1}$$

or $$Zp=\frac{Z\cdot N_2N_3}{N_1^2}$$

the value of $Zp$ to be connected across the second additional winding and required to balance the shunt impedance.

FIGURE 6 shows an arrangement whereby the transformation ratio of a transformer is made proportional to a number with five decimal digits. There are five windings, one for each digit and each divided into ten equal parts with a tapping point between each part. The number may be expressed in another numerical scale, by dividing the windings into another number of equal parts.

A first main core 60 has one primary winding 61 of one hundred turns and one primary winding 62 of ten turns. The input current is fed to the first winding by an adjustable tap 63 so that it passes through the number of parts of the winding equal to the first significant figure of the required transformation ratio, and from the "zero" tapping point 64 of the first winding it passes to an adjustable tap 65 of the second winding 62.

A separate second core 66 has two identical primary windings, constituting the third and fourth windings, the third 67 of a hundred turns and the fourth 68 of ten turns. A third core 71 has one primary winding, constituting the fifth winding 69, of one hundred turns.

The current, passes from the tap of each winding through the number of parts equal to the appropriate significant figure of the transformation ratio, and from the "zero" tapping point of that winding to the adjustable tap of the next winding, until the zero tapping point on the third core primary winding.

The third core 71 has a secondary winding 72 of one thousand turns connected to a further primary winding 73 of ten turns on the second core 66, and the second core is similarly connected to the first core 60 by second core winding 74 and first core winding 75. With these connections, a flux of one hundred ampere-turns in one core induces a flux of one ampere-turn in the preceding core.

The total flux in the first core 60 is proportional to the sum of ten times the first figure of the ratio (since there are ten turns between tapping points on the first primary) plus once the second figure plus one tenth of the third figure (since there are ten turns between tapping points on the first primary of the second core and the ratio of the turns in the connetcion between the second and first cores is one hundred) plus one hundredth the fourth figure plus one thousandth the fifth figure. The output current taken from a secondary winding 14 wound on the main first core 60 is proportional to this total flux, and is thus related to the input current by the transformation ratio set by the adjustments of the taps.

The adjustments of the taps may be made by a servomotor energised by the output of the detector.

A reversing switch may be included in the connections between the cores of the transformer, so that the windings may introduce decrements of flux in the main core if required, rather than increments.

FIGURE 7 shows an arrangement whereby the output current of a transformer is not only linearly proportional to the positions of the tapping points on the primary windings, but has components which are proportional to the first and second powers of the positions. This arrangement has particular application in resistance thermometry where the variation of resistance with temperature has terms in first and second powers of temperature.

In this arrangement, the input current passes through a first primary winding 81 ($N_1$ turns) on the main core 82 and from a tapping point 83 through part ($N_2$ turns)

of a primary winding 84 on a separate second core 85. The secondary winding 86 ($N_3$ turns) on the second core is connected in series with a second primary winding 87 ($N_4$ turns) on the first core 82 and with part on one side of a tapping point 88 ($N_5$ turns) of a primary winding 89 on a separate third core 91. The sliders 92 controlling the position of the tapping points 83, 88 are ganged together. A secondary winding 93 ($N_6$ turns) on the third core 91 is connected in series with a third primary winding 94 ($N_7$ turns) on the main core 82. The sliders 92 may be driven by a servo-motor (not shown) energised by the output of the detector.

The flux in the main core 82 due to the first primary winding 81 is proportional to the input current times the number of turns $N_1$ in the winding, ($F_1 \alpha i N_1$). The flux due to the second winding 87 is proportional to the input current times the number of turns $N_4$ in the second winding 87 times the transformation ratio of the windings 84, 86 on the second core 85 ($F_2 \alpha i N_4 N_2/N_3$). The flux due to the third winding 94 is proportional to the input current times the number of turns $N_7$ in that third winding 94 times product of the transformation ratios of the windings on the second and third cores ($F_3 \alpha i N_7 N_5 N_2/N_3 N_6$).

The current in the secondary winding of the main core 14 is proportional to the total flux in the main core 82.

$$\therefore i_1 \alpha i\left(N_1+\frac{N_2N_4}{N_3}+\frac{N_2N_5N_7}{N_3N_6}\right)$$

As the sliders 92 controlling the number of turns in the primary winding 84, 89 on the second and third cores 85, 91 through which the current flows are ganged together, $N_2$ is proportional to $N_5$, i.e. $N_5=kN_2$ $$\therefore i_1 \alpha i\left(N_1+\frac{N_4}{N_3}\cdot N_2+\frac{kN_7}{N_3N_6}\cdot N_2^2\right)$$

the voltage across the resistor $R_1$ carrying a rectified fraction of the current $i_1$, $$V_1 \alpha i R_1\left(1+\frac{N_4}{N_3N_1}\cdot N_2+\frac{kN_7}{N_3N_6N_1}\cdot N_2^2\right)$$

The resistance $R_2$ carries a current $i_2$ directly proportional to the input current $i$, as described in the examples above. If the temperature of $R_2$ varies, the value of $R_2$ is governed by the relationship $R_2=R_0\ (1+\alpha t+\beta t^2)$ where $\alpha$, $\beta$, are constants. The potential across $R_2$ is $V_2 \alpha i R_0\ (1+\alpha t+\beta t^2)$.

It can be seen that, by appropriate selection of the numbers of turns $N_3$, $N_4$, $N_6$, $N_7$, the positions of the tapping points (depending on $N_2$) can be made directly representative of the temperature.

When $R_1$ is at a controlled temperature or is not temperature dependent and $R_2$ is at an unknown temperature, the tapping point when the potentials in the resistances are balanced can be calibrated to give the unknown temperature directly. The single adjustment of the slider controlling the value of $N_2$ enables a changing temperature to be ready accurately and without delay.

The tapped primary windings 84, 89 may be replaced by multi-decade arrangements similar to that shown in FIGURE 6.

Figure 8:
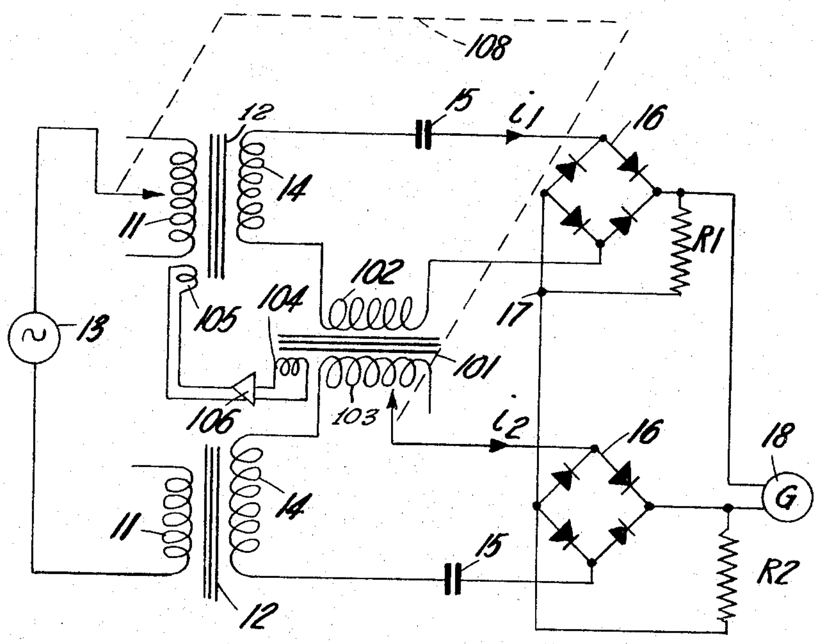
FIGURE 8 is a circuit diagram of another modified detector circuit of the example of FIGURE 1.

FIGURE 8 shows a modification to the circuit of FIGURE 1 arranged to compensate for the errors introduced by core losses in the current transformers. These core losses occur since there is a voltage drop in the transformer windings even if no loads are connected across the secondary windings. Similar modifications can be applied to the other circuits described above.

In FIGURE 8 an additional current transformer 101 is connected in the secondary circuits of both current transformers 12, the primary 102 of transformer 101 being connected in series with one secondary winding 14 and one secondary 103 of transformer 101 being connected in series with other secondary winding 14. The transformer 101 has a second secondary winding 104 feeding a signal to a primary winding 105 added to one transformer 12 through a high-gain amplifier 106.

The coils 102, 103 act in opposition on the core of transformer 101. When the currents $i_1$, $i_2$ are unequal, there is a residual flux induced in the core. The secondary winding senses this flux and its sensing current is amplified and fed to the transformer 12 to alter the current $i_1$ so as to equalise the two currents $i_1$, $i_2$. Thus if any errors in the transformers 12 have resulted in $i_1$, $i_2$ being unequal, the addition of the transformer 101 tends to eliminate the inequality. The high gain of the amplifier 106 ensures that the winding 104 takes very little current and thereby disturbs very little the flux distribution in the transformer 101.

When it is required that the currents $i_1$, $i_2$ should not be equal, but should be maintained in a given ratio, the winding 103 and the primary winding 11 of the core having the extra winding 105 are tapped, the taps being ganged together by 108 for alteration of the $i_1:i_2$ ratio.

In any of the circuits according to the invention, the reverse leakage current in the diodes of the rectifying bridges 16 can be greatly reduced by operating the diodes at a reduced temperature. The refrigeration can be accomplished by means of a semi-conductor Peltier device.

The diodes of the bridges 16 should have very small stored charge as well as very small leakage current. Since normal methods of semi-conductor fabrication result in these two requirements being almost mutually exclusive, it is normally necessary to choose a diode lying between the two extremes. A solution to the problem is to insert in each arm of the bridges 16 a pair of diodes in series. One diode of the pair has the characteristic of having a very low reverse leakage current, but not necessarily a low stored charge, while the other has the characteristic of a low stored charge but not necessarily a low reverse leakage current.

We claim:

1. Resistance comparison means for comparing first and second resistances with each other by comparing the potential across the first resistance with the potential across the second, which apparatus comprises an alternating current source, first and second current transformers each having a primary winding connected in series with each other and with said alternating current source and each having a current output proportional in a known ratio to the current flowing in its primary winding, modulating means connected to said alternating current source for modulating the supply of current from said alternating current source to the serially connected primary windings of the current transformers at a frequency of a lower order than the frequency of said alternating current source, a first rectifying circuit connected to the secondary winding of said first current transformer, a second rectifying circuit connected to the secondary winding of said second current transformer, means connecting the first resistance to said first rectifying circuit so that the rectified current from said first rectifying circuit flows therethrough, means connecting the second resistance to said second rectifying circuit so that the rectified current from said second rectifying circuit flows therethrough, the current flowing through each of said resistances being in known ratio to each other by reason of the said primary to secondary current ratio of each transformer, and a phase sensitive null detector connected to said resistances for comparing the potential at the modulation frequency across the first resistance with that across the second resistance, said modulating means being connected to said detector to provide a reference signal therefor, whereby said detector provides a comparison, and also a direction of any deviation, of the potential across the first resistance with that across the second resistance.

2. Resistance comparison means for comparing first and second resistances with each other by comparing the potential across the first resistance with the potential across the second, which apparatus comprises an alternating current source, first and second current transformers each having a primary winding connected in series with each other and with said alternating current source and each having a secondary winding for providing a current output proportional in a known ratio to the current flowing in its primary winding, a first rectifying circuit connected to the secondary winding of said first current transformer, a second rectifying circuit connected to the secondary winding of said second current transformer, means connecting the first resistance to said first rectifying circuit so that the rectified current from said first rectifying circuit flows therethrough, means connecting the second resistance to said second rectifying circuit so that the rectified current from said second rectifying circuit flows therethrough, the current flowing through each of said resistances being in known ratio to each other by reason of said primary to secondary current ratio of said transformer, said first current transformer having an additional secondary winding and an additional input winding, a high gain amplifier having a series input impedance, means for feeding said amplifier from said additional secondary winding, means feeding the output of said amplifier to said additional input winding, and detecting means connected to said resistances for comparing the potential across the first resistance with that across the second resistance to thereby obtain a resistive comparison of the first resistance to the second resistance.

3. Resistance comparison means for comparing two resistances by comparing the potentials across them when currents in known ratio are fed through the two resistances, which apparatus comprises an alternating current source, two current transformers each having a primary winding fed from said alternating current source and a secondary winding, one of said two current transformers having a further input winding, each of said transformers being arranged so that the current in the secondary winding is proportional in a known ratio to the current in the primary winding, two rectifying circuits connected respectively to said secondary windings, means for feeding currents from said rectifying circuits respectively through said two resistances, an amplifier, a third current transformer having two windings energized in opposition by the respective currents fed to said rectifying circuits from said secondary windings of said two current transformers, said third current transformer having a third winding connected to the input to said amplifier, means feeding the output from said amplifier to said further input winding, and a detector for comparing the potential across said resistances.

4. Resistance comparison means for comparing first and second resistances with each other by comparing the potential across the first resistance with the potential across the second, which apparatus comprises an alternating current source, first and second current transformers each having a primary winding connected in series with each other and with said alternating current source and each having a secondary winding for providing a current output proportional in a known ratio to the current flowing in its primary winding, said first current transformer including a first core and a second core, the primary winding of said first transformer comprising adjustably tapped winding portions on said second core and a number of adjustably tapped winding portions on said first core, said first transformer further having a winding portion on the first core energized by the first mentioned adjustably tapped winding portions, said adjustably tapped winding portions being connected in series and said first transformer having its secondary winding on said first core, a first rectifying circuit connected to the secondary winding of said first current transformer, a second rectifying circuit connected to the secondary winding of said second current transformer, means connecting the first resistance to said first rectifying circuit so that the rectified current from said first rectifying circuit flows therethrough, means connecting the second resistance to said second rectifying circuit so that the rectified current from said second rectifying circuit flows therethrough, the current flowing through each of said resistances being in known ratio to each other by reason of said primary to secondary current ratio of each transformer, and detecting means connected to said resistances for comparing the potential across the first resistance with that across the second resistance to thereby obtain a resistive comparison of the first resistance to the second resistance.

5. Resistance comparison means for comparing first and second resistances by comparing the potential across the first resistance with the potential across the second when currents in a known ratio are fed through said first and second resistances, said apparatus comprising an alternating current source, a first current transformer having a core, a first primary winding energized from said alternating current source and a secondary winding, the second current transformer having a primary winding fed from said alternating current source and a secondary winding, each of the aforementioned transformers being arranged so that the current in its respective above mentioned secondary winding is proportional in a known ratio to the current in its above mentioned primary winding, a third current transformer having a secondary winding and a primary winding including a number of adjustably tapped winding portions that are connected in series with each other and with said first primary winding, said first current transformer having a second primary winding connected to be energized from said third current transformer secondary winding, two rectifying circuits connected respectively to the first two mentioned secondary windings, respective means for feeding current from each of said rectifying circuits through said first and second resistances, and a detector for comparing the potential across the first resistance with that across the second resistance to thereby obtain a resistive comparison of the first resistance to the second resistance.

6. Resistance comparison means as claimed in claim 5 further characterized in that said first current transformer has a third primary winding and that there is provided a fourth current transformer having a primary winding including a number of adjustably tapped winding portions connected in series with the secondary winding of said third current transformer, said fourth current transformer having a secondary winding for energizing the third primary winding of said first current transformer.

References Cited

UNITED STATES PATENTS

| | | | |
|---|---|---|---|
| 1,397,228 | 11/1921 | Nyquist | 324—63 |
| 1,964,141 | 6/1934 | Rhodes et al. | 324—57 |
| 2,059,594 | 11/1936 | Massa | 324—119 X |
| 2,297,436 | 9/1942 | Scholz | 324—57 |
| 2,363,372 | 11/1944 | White | 324—119 X |
| 2,457,727 | 12/1948 | Rifenbergh | 324—57 X |
| 2,509,621 | 5/1950 | Willoughby | 330—10 |
| 2,551,291 | 5/1951 | Rich | 324—119 X |
| 2,783,435 | 2/1957 | Wilhelm | 324—57 |
| 2,881,392 | 4/1959 | Heinz | 324—63 X |
| 3,031,614 | 4/1962 | Calvert | 324—57 |
| 3,058,066 | 10/1962 | Redding et al. | 324—119 X |
| 3,063,929 | 11/1962 | Phelan | 324—99 X |

FOREIGN PATENTS

| | | |
|---|---|---|
| 847,107 | 9/1960 | Great Britain. |
| 917,196 | 1/1963 | Great Britain. |

WALTER L. CARLSON, *Primary Examiner.*

E. E. KUBASIEWICZ, *Assistant Examiner.*